(12) United States Patent
Park et al.

(10) Patent No.: US 8,590,960 B2
(45) Date of Patent: Nov. 26, 2013

(54) FLUSH GLASS ASSEMBLY FOR VEHICLE

(75) Inventors: Hyung Soo Park, Seoul (KR); Gi Won Kim, Hwaseong-si (KR); Jae Sueng Lee, Hwaseong-si (KR); Chong Heon Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/494,454

(22) Filed: Jun. 12, 2012

(65) Prior Publication Data
US 2013/0145694 A1 Jun. 13, 2013

(30) Foreign Application Priority Data
Dec. 9, 2011 (KR) ........................ 10-2011-0131827

(51) Int. Cl.
*B60J 1/00* (2006.01)
(52) U.S. Cl.
USPC ..................................... 296/146.16; 296/201

(58) Field of Classification Search
USPC ......... 296/146.15, 146.16, 190.1, 201; 49/61, 49/63, 125, 380, 413
See application file for complete search history.

(56) References Cited

U.S. PATENT DOCUMENTS

| 4,850,139 | A | * | 7/1989 | Tiesler ............................ 49/130 |
| 5,799,444 | A |   | 9/1998 | Freimark et al. |
| 7,073,293 | B2 | * | 7/2006 | Galer .............................. 49/413 |
| 7,735,897 | B2 | * | 6/2010 | Seiple et al. ................. 296/84.1 |
| 2004/0020131 | A1 | * | 2/2004 | Galer et al. .................... 49/413 |
| 2004/0134131 | A1 | * | 7/2004 | Galer ............................. 49/413 |
| 2006/0107600 | A1 | * | 5/2006 | Nestell et al. .................. 49/413 |

* cited by examiner

*Primary Examiner* — Lori Lyjak
(74) *Attorney, Agent, or Firm* — Morgan, Lewis & Bockius LLP

(57) ABSTRACT

Provided is a flush glass assembly for a vehicle. The flush glass assembly is constructed so that, when a moving glass is opened, a direction of the force which a user applies to a handle is the same horizontal direction as that in which the moving glass slides to open.

10 Claims, 17 Drawing Sheets

FLUSH GLASS ASSEMBLY FOR VEHICLE

CROSS-REFERENCE TO RELATED APPLICATIONS

The present application claims priority of Korean Patent Application Number 10-2011-0131827 filed Dec. 9, 2011, the entire contents of which application is incorporated herein for all purposes by this reference.

BACKGROUND OF INVENTION

1. Field of Invention

The present invention relates, in general, to a flush glass assembly for a vehicle, and more particularly to a flush glass assembly for a vehicle, which enables a user to easily open or close flush glass.

2. Description of Related Art

Flush glass is a sort of door glass that slides in a frontward or rearward direction of a vehicle, thereby opening or closing. This flush glass 1 is mounted on a sliding door 2 of a recreational vehicle, as shown in FIG. 1.

As shown in FIG. 2, such flush glass 1 is designed so that moving glass 1a slides relative to fixed glass 1b to the front or rear and thus opens or closes. Handles 4 that can slide up and down are installed on a middle portion of the moving glass, and are connected with locking noses 5 at upper and lower ends thereof.

Thus, when the handles 40 are operated so as to be located at a middle position of a frame 3, the upper and lower locking noses 5 come out of a rail, and thus are unlocked to enable a user to move the moving glass 1a. When the handles 4 in operation are released, or when the handles 4 are not being operated, the locking noses 5 are inserted into the rail in a locked state by the strong force of locking springs 6, so that the moving glass 1a stays in the locked state and cannot slide.

However, as mentioned above, this flush glass assembly is designed so that the handles 4 are operated by being moved up and down, and the moving glass 1a moves in a horizontal direction. Thus, when a user intends to slide the moving glass 1a, the user must apply vertical force and horizontal force to the handle 40 at the same time. As such, the user expends a lot of energy when opening or closing the moving glass 1a, and suffers because operating them is uncomfortable.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art to provide a flush glass assembly for a vehicle that enables a user to open or close moving glass by providing only horizontal force to a handle, thereby allowing the user to easily open or close the moving glass, and thus improving the ease with which the user performs the operation.

Various aspects of the present invention provide for a flush glass assembly for a vehicle, which includes front and rear rails that are fixed to a fixed glass frame in a lengthwise direction of the vehicle, a front guide that is rotatably coupled to a front vertical frame of a moving glass frame, and is fitted into the front rails so that upper and lower ends thereof are allowed to move along the front rails, a rear guide that is rotatably coupled to a rear vertical frame of the moving glass frame, and is fitted into the rear rails so that upper and lower ends thereof are allowed to move along the rear rails, and a handle that is locked by connection with a middle vertical frame of the fixed glass frame when moving glass is kept closed, and is rotatably coupled to the rear guide so as to allow the rear vertical frame of the moving glass frame to protrude towards an interior of the vehicle when external force is applied in a rearward direction to open the moving glass.

Here, the front rails may be constructed to farther protrude toward the interior of the vehicle than the rear tails.

Further, the front guide may include a front hinge that is rotatably coupled to the front vertical frame of the moving glass frame via a front hinge shaft and is integrally formed with front rail locking pins fitted into the front rails at upper and lower ends thereof, and a front carrier that is rotatably coupled to an intermediate hinge shaft formed on an intermediate portion of the front hinge and is integrally formed with front rail lugs fitted into the front rails at upper and lower ends thereof.

Also, the rear guide may include a rear hinge that is rotatably coupled to the rear vertical frame of the moving glass frame via a rear hinge shaft and is integrally formed with rear rail locking noses fitted into the rear rails at upper and lower ends thereof, and a rear carrier that is rotatably coupled to a first hinge shaft formed on an intermediate portion of the rear hinge and is integrally formed with rear rail lugs fitted into the rear rails at upper and lower ends thereof.

Each front rail locking pin may be formed so as to have a quadrilateral cross section. Each front rail may include a front rail lock at a front-side end thereof, wherein the front rail lock may include a front rail locking hole having a symmetrical sector form into which the front rail locking pin is allowed to be inserted.

Further, an intermediate portion of the front vertical frame of the moving glass frame may be integrally formed with a front frame protrusion, through which the front hinge shaft passes to make a pivotable connection with the front hinge.

Each rear rail locking nose may be formed so as to have a quadrilateral cross section. Each rear rail may include a rear rail lock at a front-side end thereof, wherein the rear rail lock may include a rear rail lock hole having a symmetrical sector form into which the rear rail locking nose is allowed to be inserted.

Further, the rear vertical frame may be integrally formed with a pair of rear frame protrusions, into which the rear hinge shaft is fitted to form a pivotable connection with the rear hinge, on upper and lower sides thereof. The rear frame protrusions may be integrally connected with a handle frame that is bent towards the interior of the vehicle between the rear frame protrusions. The handle frame may include a handle hole between the rear vertical frame and the rear frame protrusions so that the handle is installed through the handle hole.

The rear hinge may be integrally formed with a second hinge shaft parallel to the first hinge shaft at the intermediate portion thereof. The handle may include a handle body having a shaft hole into which the second hinge shaft is rotatably fitted, a handle operating part that is integrally formed with the handle body and is installed through the handle hole to come into contact with the handle frame, and a handle locking part that is integrally formed with the handle body and is installed so as to be in contact with a bottom of the rear hinge.

Further, the handle locking part may include a handle locking groove for locking with the middle vertical frame of the fixed glass frame in a lengthwise direction thereof. The middle vertical frame may be integrally formed with a frame locking rib that has an L-shaped cross section and is inserted into the handle locking groove.

The flush glass assembly according to the present invention is constructed so that, when the moving glass is opened, the direction of the force which a user applies to the handle is the same as the horizontal direction in which the moving glass slides to open, so that it is possible to greatly improve the ease of operation by the user, and to enhance the merchantability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
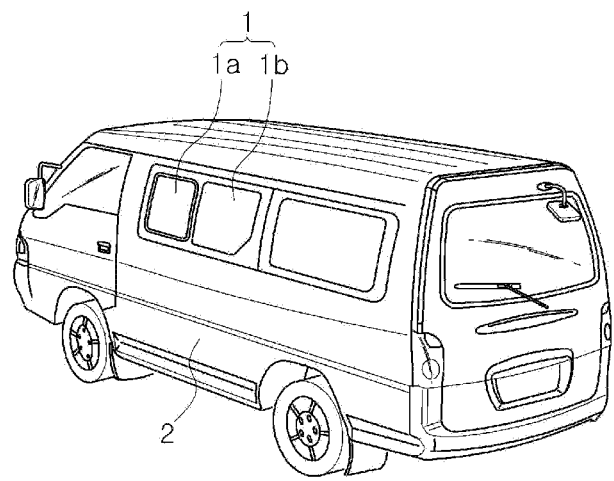
FIG. 1 is a perspective view showing a vehicle equipped with flush glass.
Figure 2:
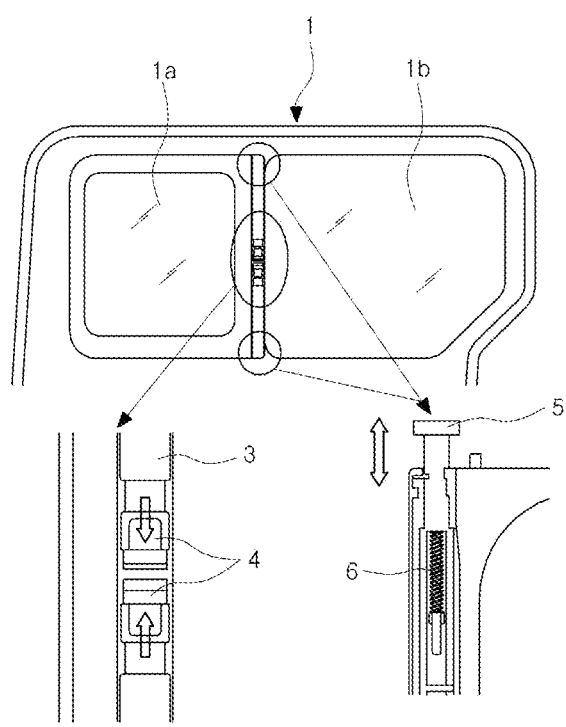
FIG. 2 is a view that explains a conventional flush glass assembly.
Figure 3:
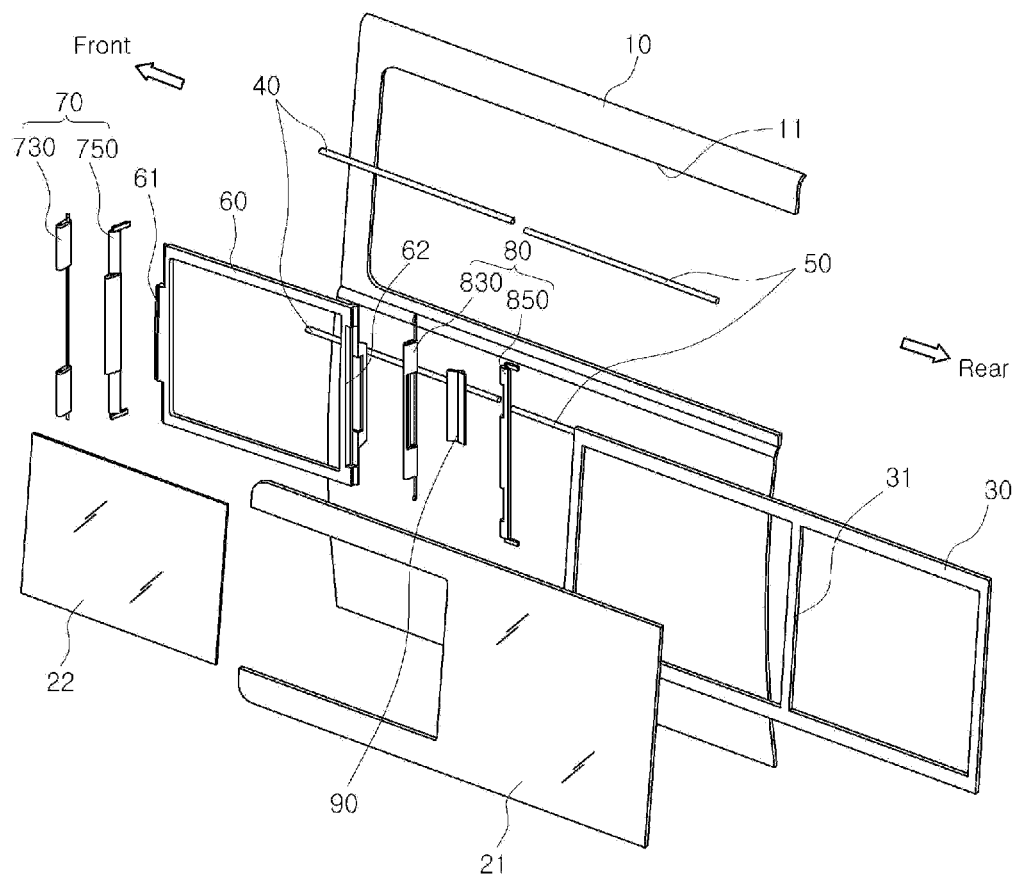
FIG. 3 is an exploded perspective view showing an exemplary flush glass assembly for a vehicle according to the present invention.
Figure 4:
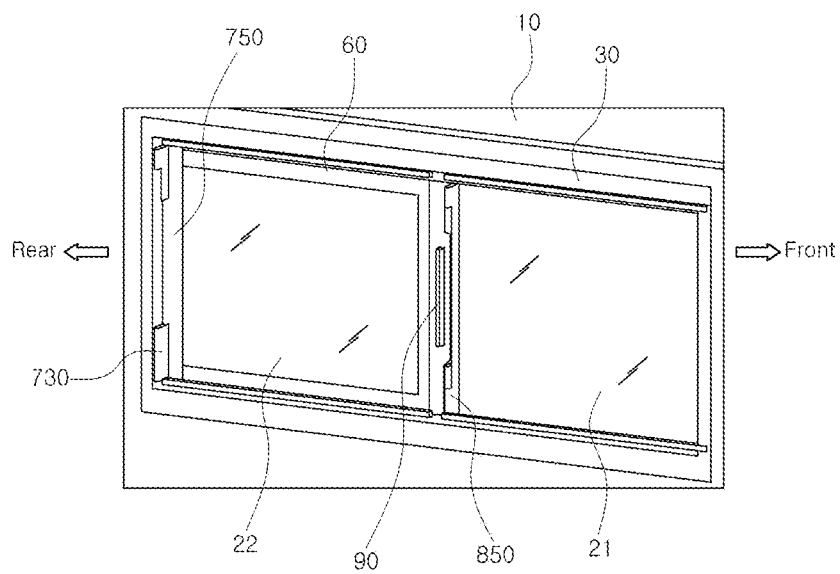
FIG. 4 is a view of an exemplary flush glass assembly according to the present invention when viewed from the interior of the vehicle.
Figure 5:
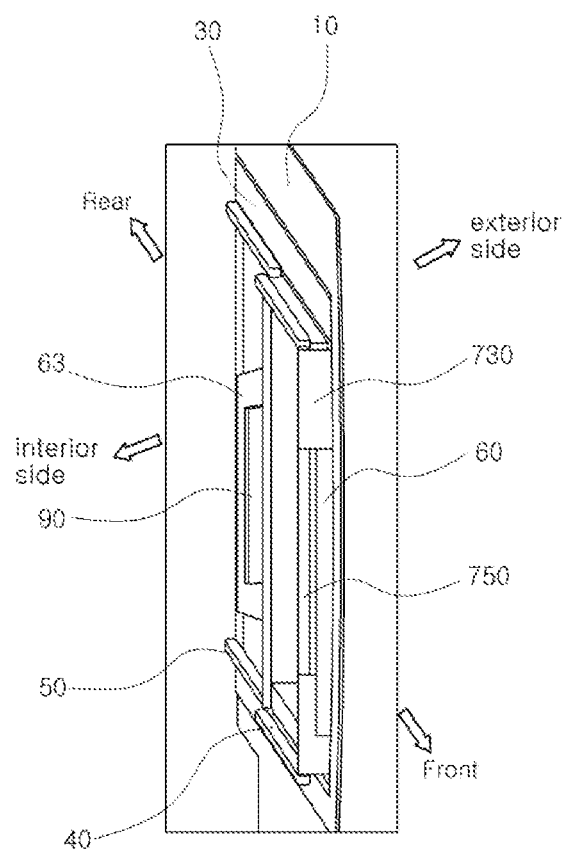
FIG. 5 is a view of the flush glass assembly when viewed from the rear of FIG. 4.
Figure 6:
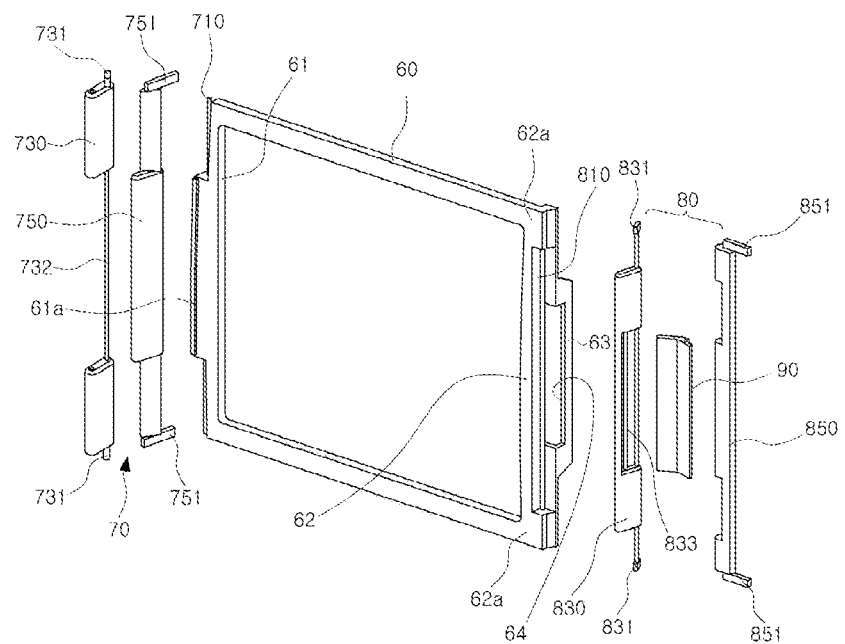
FIG. 6 is an exploded perspective view showing an exemplary moving glass frame as well as exemplary front and rear guides in the flush glass assembly according to the present invention.
Figure 7:
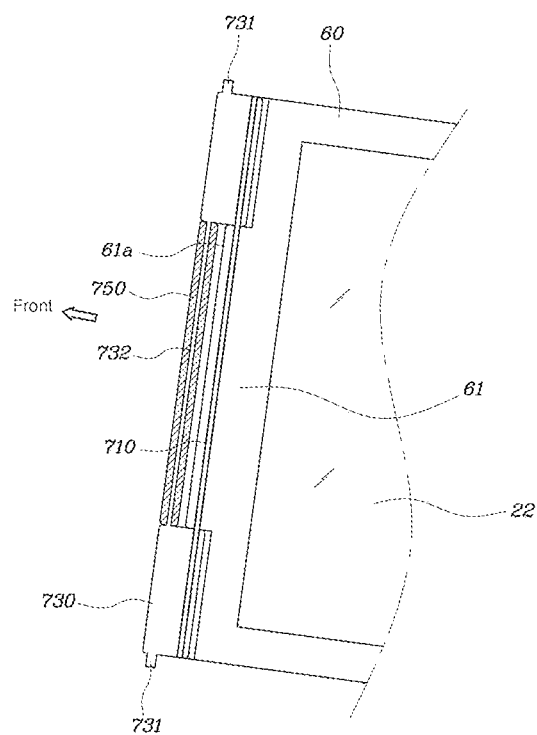
FIG. 7 is a view that explains an exemplary coupling structure of the moving glass frame and the front guide in the flush glass assembly according to the present invention.
Figure 8:
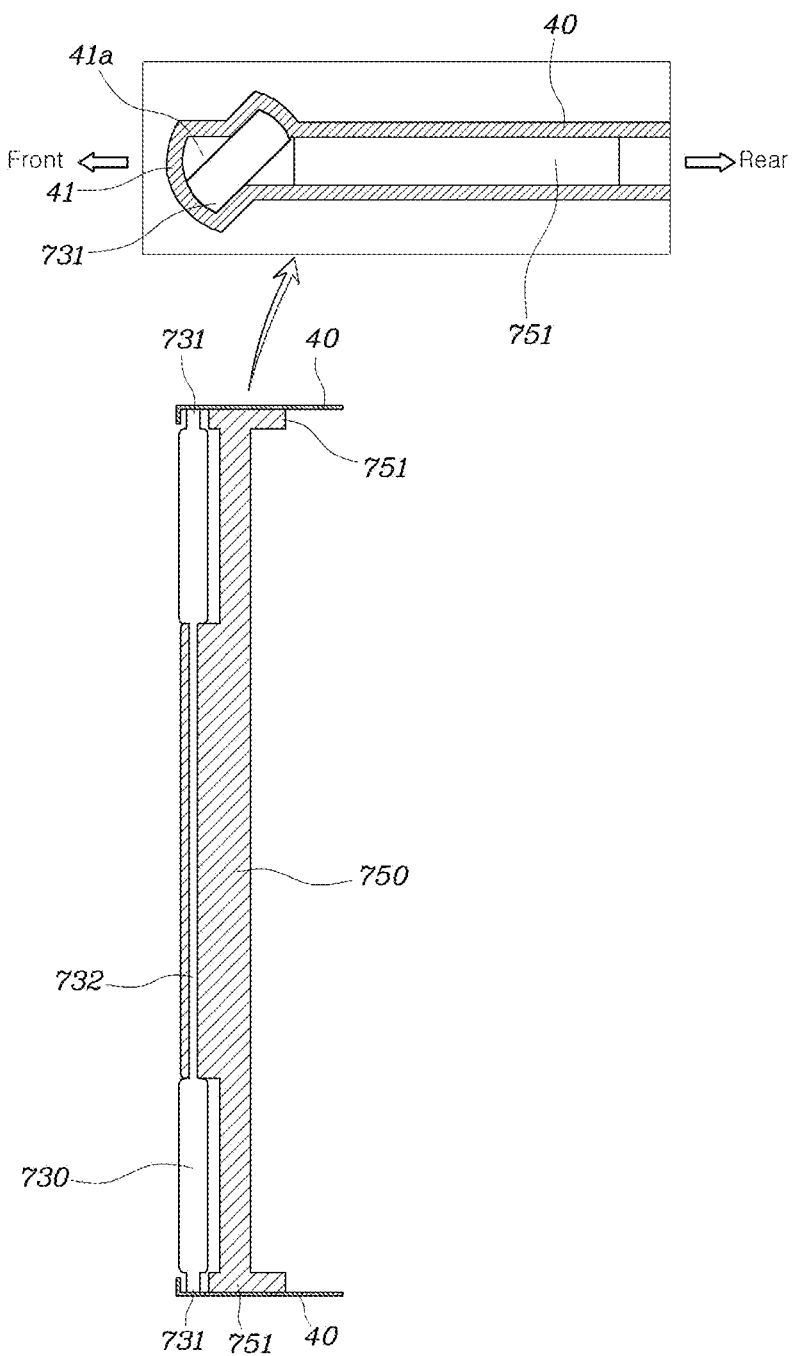
FIG. 8 is a view that explains an exemplary coupling structure of the moving glass frame and front rails in the flush glass assembly according to the present invention.
Figure 9:
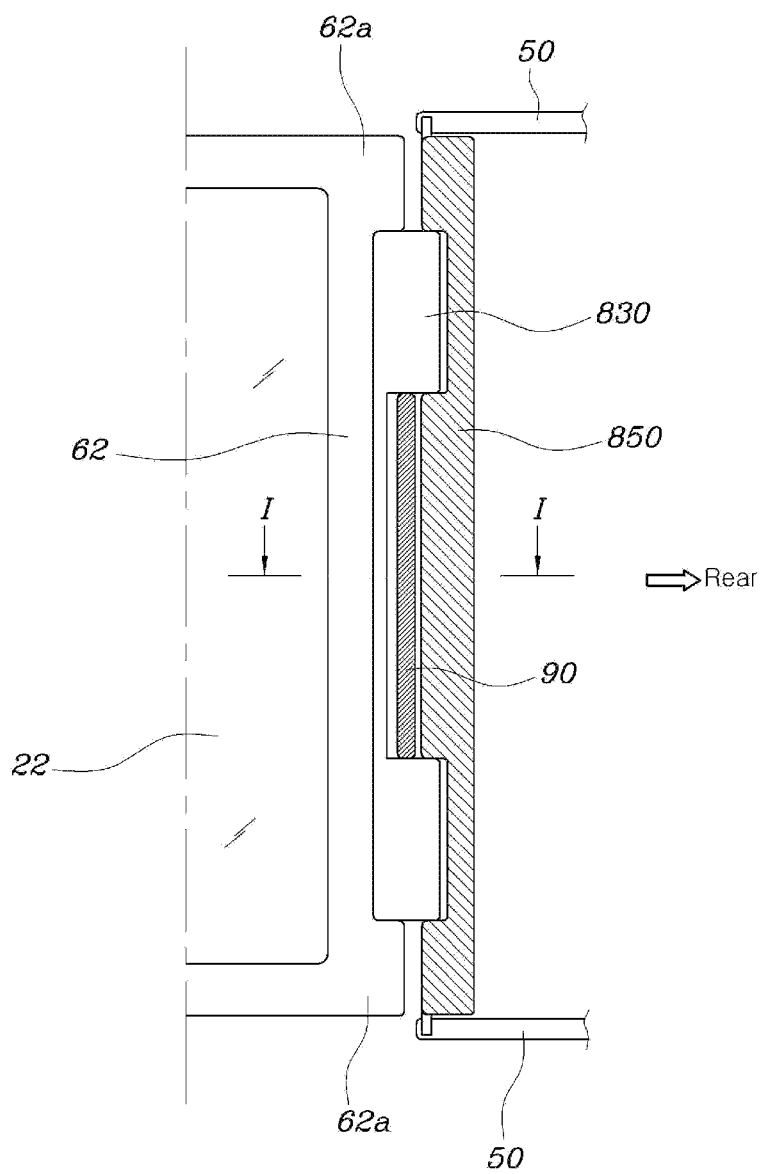
FIG. 9 is a view that explains an exemplary coupling structure of the moving glass frame and the rear guide in the flush glass assembly according to the present invention.
Figure 10:
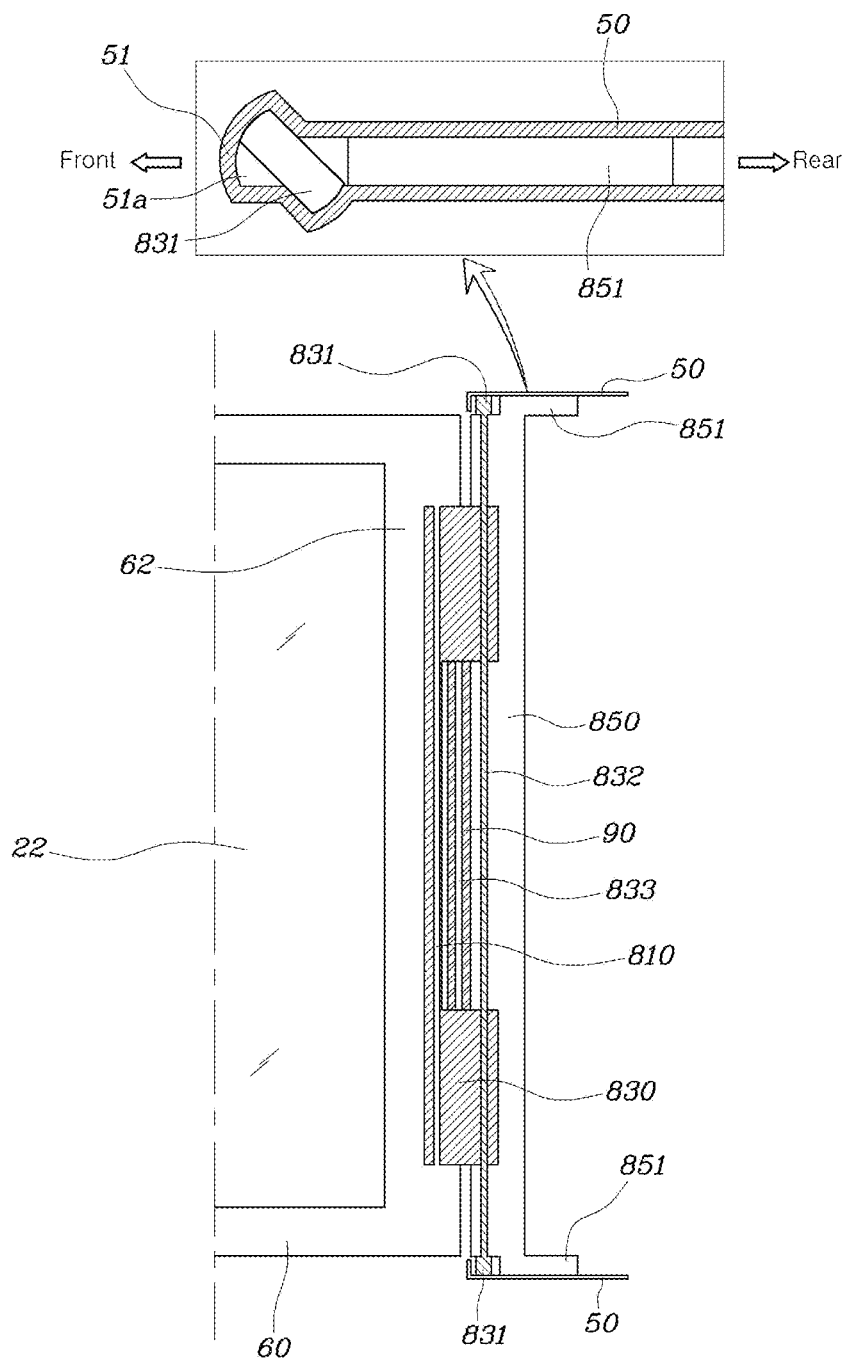
FIG. 10 is a view that explains an exemplary coupling structure of the rear guide and rear rails in the flush glass assembly according to the present invention.
Figure 11:
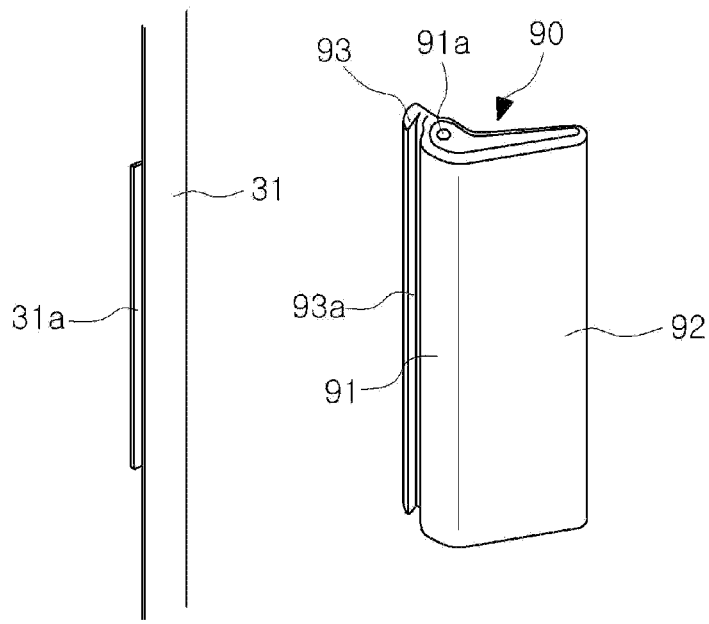
FIG. 11 is a view that explains a locked structure of a handle and a fixed glass frame in an exemplary flush glass assembly according to the present invention.
Figure 12:
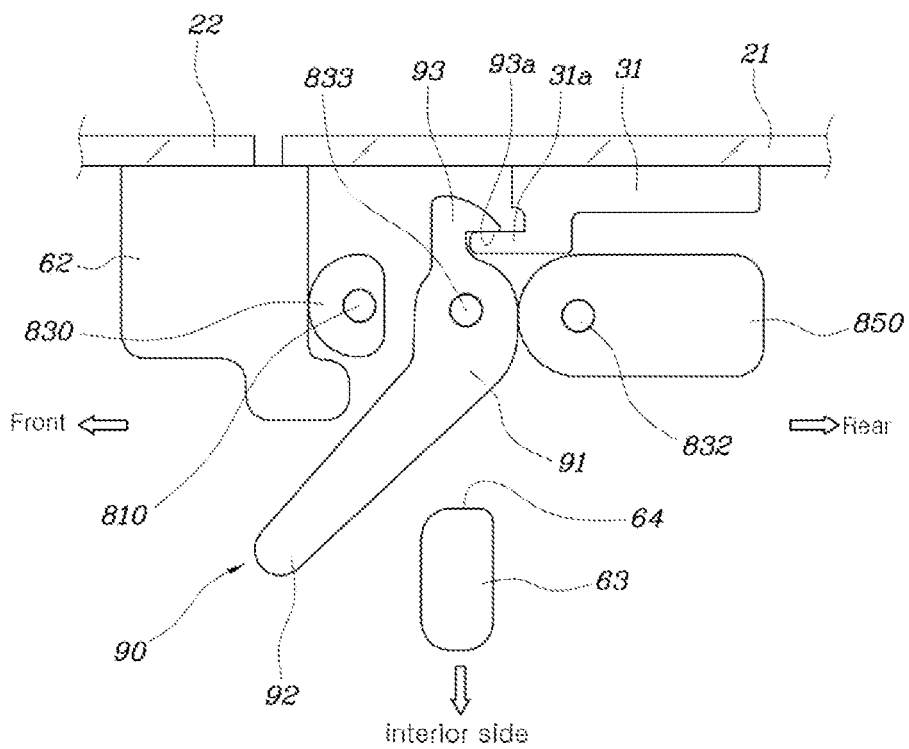
FIG. 12 is a cross-sectional view taken along line I-I of FIG. 9 in order to explain an installed structure of the handle in the flush glass assembly according to the present invention.

As shown FIG. 3, a recreational vehicle is equipped with a sliding door 10 so as to enable rear passengers to get in or out. A fixed glass frame 30 to which fixed glass 21 is coupled is fixed in an opening 11 of the sliding door 10. Front rails 40 and rear rails 50 are fixed to the fixed glass frame 30. A moving glass frame 60 to which the moving glass 22 is coupled is installed on the fixed glass frame 30 using the front rails 40 and the rear rails 50.

In detail, as shown in FIGS. 3 to 12, the flush glass assembly for a vehicle according to various embodiments of the present invention includes front and rear rails 40 and 50 that are fixed to a fixed glass frame 30 in a lengthwise direction of the vehicle, a front guide 70 that is rotatably coupled to a front vertical frame 61 of a moving glass frame 60 and is fitted into the front rails 40 so that upper and lower ends thereof can move along the front rails 40, a rear guide 80 that is rotatably coupled to a rear vertical frame 62 of the moving glass frame 60 and is fitted into the rear rails 50 so that upper and lower ends thereof can move along the rear rails 50, and a handle 90 that is locked by connection with a middle vertical frame 31 of the fixed glass frame 30 when the moving glass 22 is kept closed, and is rotatably coupled to the rear guide 80 so as to allow the rear vertical frame 62 of the moving glass frame 60 to protrude toward the interior of the vehicle when external force is applied in the rearward direction to open the moving glass 22.

Here, there are two front rails 40 that are fixed to front-side upper and lower ends of the fixed glass frame 30 in a lengthwise direction of the vehicle, respectively. There are also two rear tails 50 that are fixed to rear-side upper and lower ends of the fixed glass frame 30 in a lengthwise of the vehicle, respectively.

The front rails 40 are constructed to protrude farther into the interior of the vehicle than do the rear tails 50 in order to more stably fix the moving glass frame 60 when the moving glass 22 is being kept closed.

Meanwhile, the front guide 70 includes a front hinge 730 that is rotatably coupled to the front vertical frame 61 of the moving glass frame 60 by a front hinge shaft 710 and is integrally formed and/or monolithically formed with front rail locking pins 731 fitted into the front rails 40 at upper and lower ends thereof, and a front carrier 750 that is rotatably coupled to an intermediate hinge shaft 732 formed on an intermediate portion of the front hinge 730 and is integrally formed and/or monolithically formed with front rail lugs 751 fitted into the front rails 40 at upper and lower ends thereof.

An intermediate portion of the front vertical frame 61 of the moving glass frame 60 is integrally formed and/or monolithically formed with a front frame protrusion 61a through which the front hinge shaft 710 passes to form a pivotable connection with the front hinge 730.

Each front rail locking pin 731 is formed to have a quadrilateral cross section. Each front rail 40 is provided with a front rail lock 41 at a front-side end thereof. The front rail lock 41 is provided with a front rail locking hole 41a having a symmetrical sector form into which the front rail locking pin 731 can be inserted.

The rear guide 80 includes a rear hinge 830 that is rotatably coupled to the rear vertical frame 62 of the moving glass frame 60 via a rear hinge shaft 810 and is integrally formed and/or monolithically formed with rear rail locking noses 831 fitted into the rear rails 50 at upper and lower ends thereof, and a rear carrier 850 that is rotatably coupled to a first hinge shaft 832 formed on an intermediate portion of the rear hinge 830 and is integrally formed and/or monolithically formed with rear rail lugs 851 fitted into the rear rails 50 at upper and lower ends thereof.

Here, the structure of the first hinge shaft 832 is a structure in which opposite ends thereof extend through upper and lower ends of the rear hinge 830, and in which the rear rail locking noses 831 are integrally formed and/or monolithically formed at the opposite ends thereof.

Each rear rail locking nose 831 is formed so as to have a quadrilateral cross section. Each rear rail 50 is provided with a rear rail lock 51 at a front-side end thereof. The rear rail lock 51 is provided with a rear rail lock hole 51 having a symmetrical sector form into which the rear rail locking nose 831 can be inserted.

Upper and lower sides of the rear vertical frame 62 of the moving glass frame 60 are integrally formed and/or monolithically formed with a pair of rear frame protrusions 62a, into which the rear hinge shaft 810 is fitted to form a pivotable connection with the rear hinge 830. The rear frame protrusions 62a are integrally connected with a handle frame 63 that is bent towards the interior of the vehicle between the rear frame protrusions 62a. The handle frame 63 is provided with a handle hole 64 between the rear vertical frame 62 and the rear frame protrusions 62a. The handle 90 is installed through the handle hole 64.

The rear hinge 830 is integrally formed and/or monolithically formed with a second hinge shaft 833 parallel to the first hinge shaft 810 at the intermediate portion thereof.

The handle 90 includes a handle body 91 having a shaft hole 91a into which the second hinge shaft 833 of the rear hinge 830 is rotatably fitted, a handle operating part 92 that is integrally formed and/or monolithically formed with the handle body 91 and is installed through the handle hole 64 to come into contact with the handle frame 63, and a handle locking part 93 that is integrally formed and/or monolithically formed with the handle body 91 and is installed so as to be put in contact with the bottom of the rear hinge 830.

Here, the handle locking part 93 is provided with a handle locking groove 93a in order to lock the middle vertical frame 31 of the fixed glass frame 30 in a lengthwise direction. The middle vertical frame 31 of the fixed glass frame 30 is integrally formed and/or monolithically formed with a frame locking rib 31a that has an L-shaped cross section and is inserted into the handle locking groove 93a.

Hereinafter, a process of operating the flush glass assembly according to various embodiments of the present invention will be described.

Figure 13:
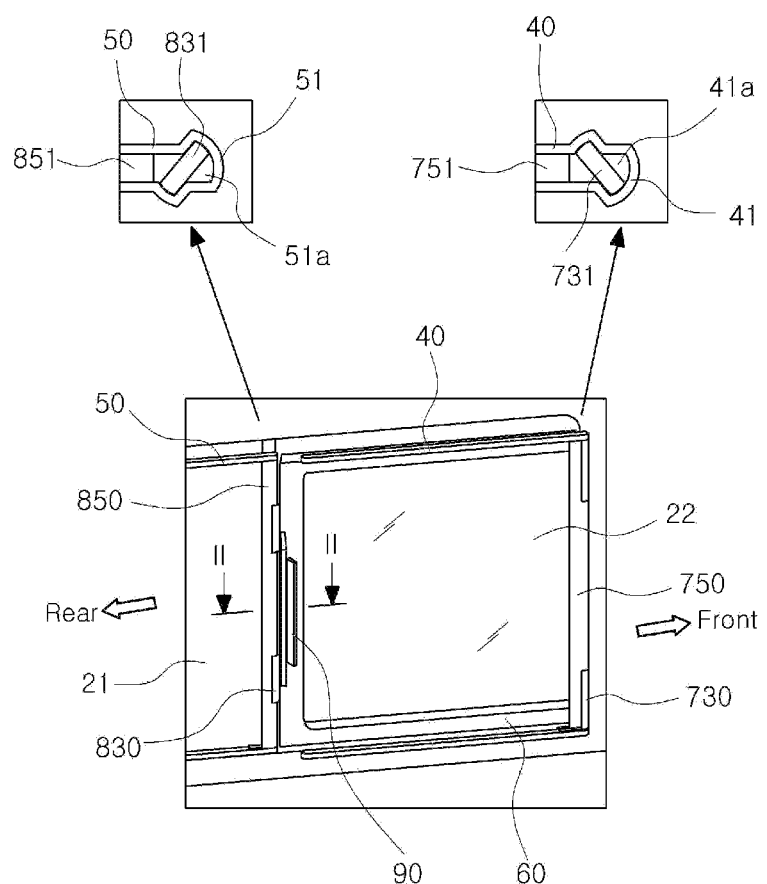
FIG. 13 is a view showing a closed state of the moving glass in an exemplary flush glass assembly according to the present invention.
Figure 14:
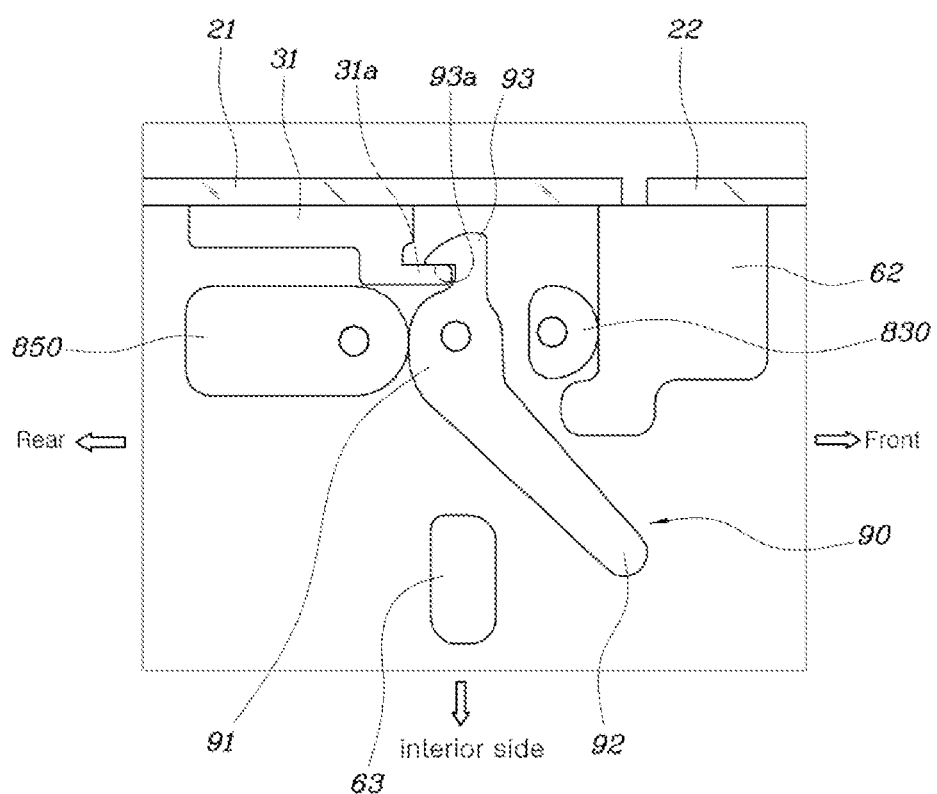
FIG. 14 is a cross-sectional view taken along line II-II of FIG. 13.

FIGS. 13 and 14 are views showing a closed state of the moving glass 22. In this case, the moving glass frame 60 is located at a front-side end of the fixed glass frame 30.

In this state, the handle locking groove 93a formed in the handle 90 is fastened to the frame locking rib 31a formed on the middle vertical frame 31 of the fixed glass frame 30. Further, the front rail locking pins 731 are inserted into the front rail locking holes 41a, and are rotated at a predetermined angle with respect to a lengthwise direction of the front rails 40. The rear rail locking noses 831 are also inserted into rear rail locking holes 51a, and are rotated at a predetermined angle with respect to a lengthwise direction of the rear rails 50. Thus, the moving glass frame 60 is maintained in a closed state so as to be located at the front-side end of the fixed glass frame 30.

Figure 15:
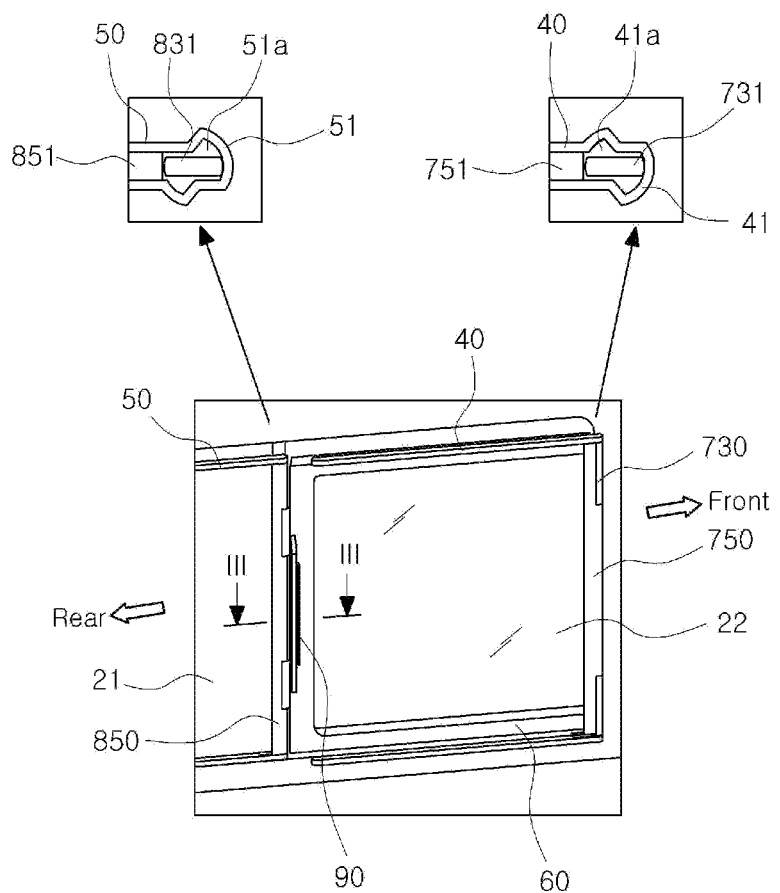
FIG. 15 is a view showing a state of operating the handle in order to open the moving glass.
Figure 16:
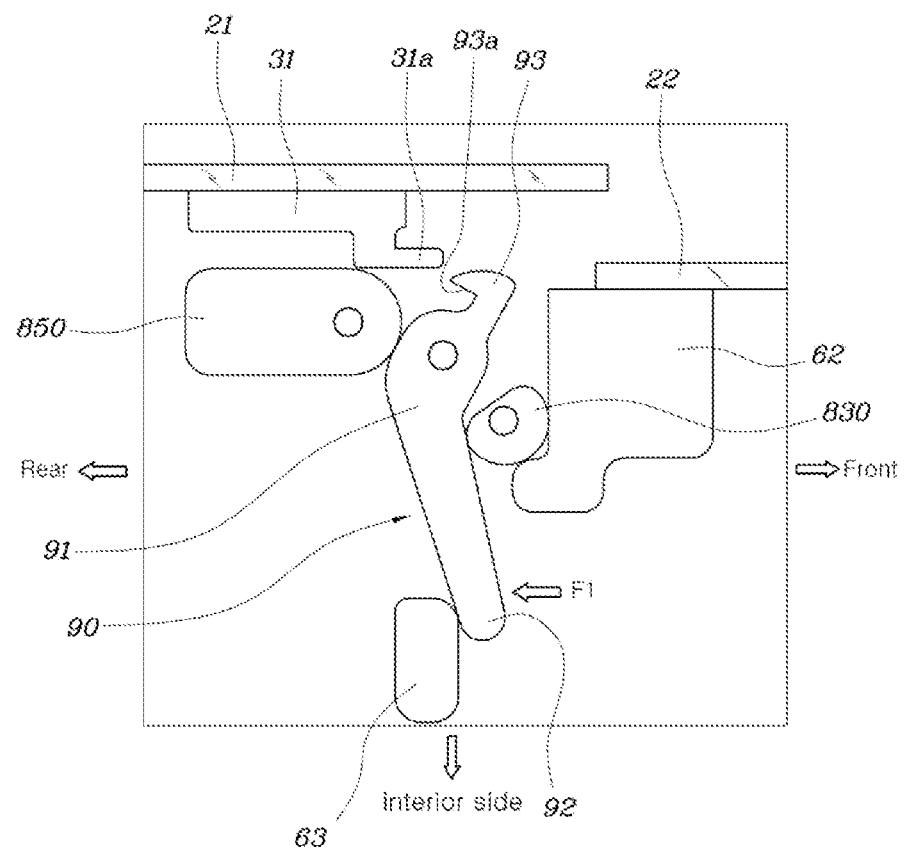
FIG. 16 is a cross-sectional view taken along line III-III of FIG. 15.

FIGS. 15 and 16 are views showing a state of operating the handle 90 in order to open the moving glass 22.

To open the moving glass 22, a user turns the handle operating part 92 in a counterclockwise direction (to the left) in the state of FIG. 14. In this case, a direction of force of the user applied to the handle 90 is the same as a horizontal direction (to the rear) in which the moving glass 22 slides to open.

Then, the handle 90 maintained in the state of FIG. 14 is turned about the second hinge shaft 833 of the rear hinge 830 in a counterclockwise direction, as shown in FIG. 16. In this case, the handle locking groove 93a of the handle 90 is released from the frame locking rib 31a of the middle vertical frame 31, as shown in FIG. 16. Further, the handle operating part 92 supplies force to the moving glass frame 60 and comes into contact with the handle frame 63 of the moving glass frame 60 which allows the moving glass frame 60 to move to the rear. At the same time, the handle body 91 comes into contact with the bottom of the rear hinge 830, and thus moves the rear hinge 830 toward the interior of the vehicle.

That is, when the handle 90 is turned, the rear hinge 830 protrudes toward the interior of the vehicle, and the rear vertical frame 62 of the moving glass frame 60 also protrudes towards the interior of the vehicle. Thus, the rear side of the moving glass 22 protrudes relative to the fixed glass 21 towards the interior of the vehicle, and thus is located at an eccentric position.

This state refers to a state in which the moving glass frame 60 is ready to move along the front and rear rails 40 and 50 in a rearward direction. In this case, the front rail locking pins 731 are aligned in the lengthwise direction of the front rails 40 after they have been inserted in the front rail rocking holes 41a. This state is possible because the front hinge 730 rotates about the front hinge shaft 710.

Further, the rear rail locking noses 831 are also aligned in the lengthwise direction of the rear rails 50 after they have been inserted in the rear rail rocking holes 51a. This state is possible because the rear hinge 830 rotates about the rear hinge shaft 810.

Figure 17:
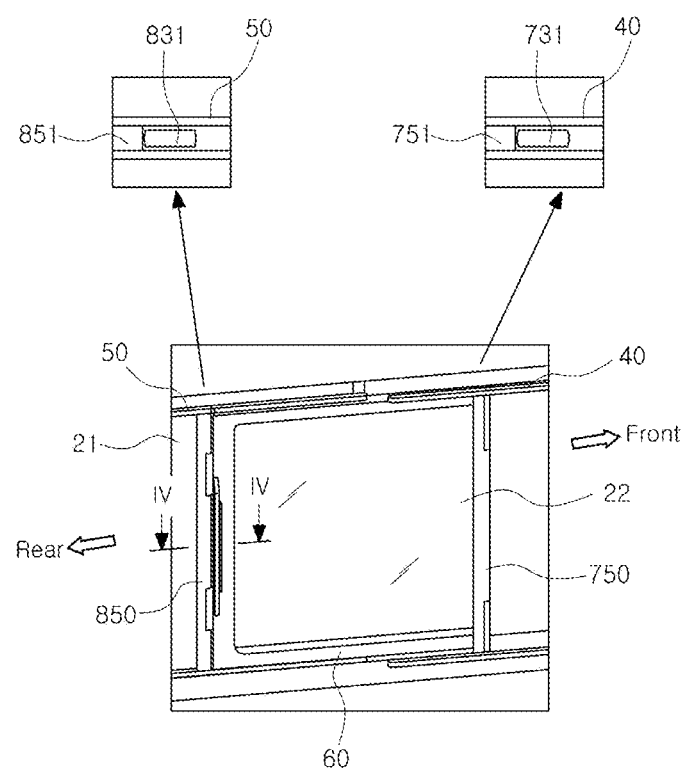
FIG. 17 is a view showing a state in which the moving glass is opening.
Figure 18:
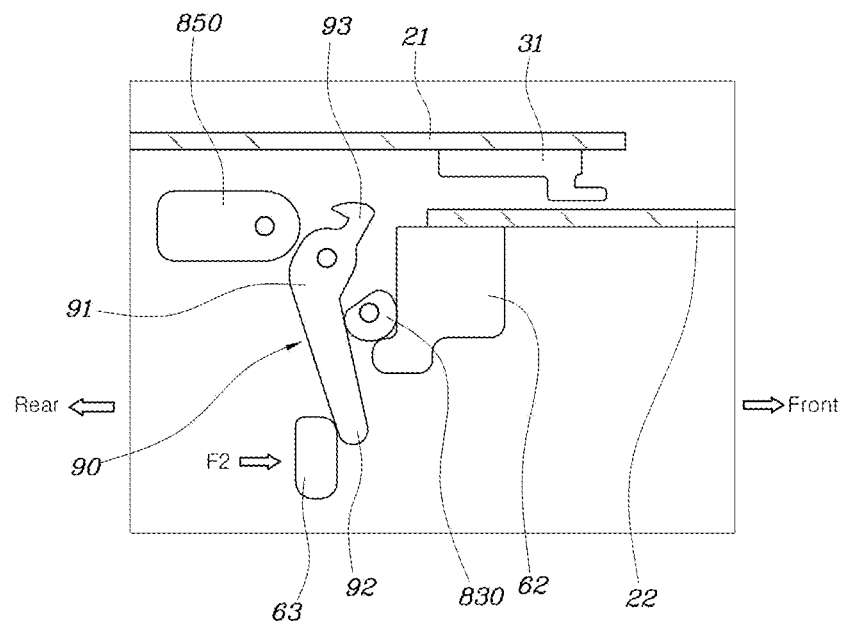
FIG. 18 is a cross-sectional view taken along line IV-IV of FIG. 17.

FIGS. 17 and 18 are views showing a state in which the moving glass frame 60 is moving along the front and rear rails 40 and 50 in a rearward direction, i.e. the moving glass 22 is opening.

After the moving glass frame 60 is ready to be able to move along the front and rear rails 40 and 50 in a rearward direction as shown in FIG. 16, a user applies force (arrow F1) to the handle operating part 92, thereby pushing the handle frame 63 in the rearward direction. Then, the front rail locking pins 731 and the front rail lugs 751 move along the front rails 40 in the rearward direction, and simultaneously the rear rail locking noses 831 and the rear rail lugs 851 move along the rear rails 50 in the rearward direction. Thereby, the moving glass frame 60 moves along the front and rear rails 40 and 50 in the rearward direction. As a result, the moving glass 22 moves, and thus is switched into an open state.

When a user wants to close the open moving glass 22, the user applies force (arrow F2) to the handle frame 63 shown in FIG. 18, thereby pushing the handle frame 63 in the frontward direction.

Then, the moving glass frame 60 moves along the front and rear rails 40 and 50 in the frontward direction, and finally moves to the front-side end of the fixed glass frame 30. Here, the handle 90 as well as the front rail locking pins 731 and the rear rail locking noses 831 are switched into the state as shown in FIGS. 13 and 14. Thereby, the moving glass 22 is allowed to maintain a closed state so as to be fixedly located at the front-side end of the fixed glass frame 30.

Figure 19:
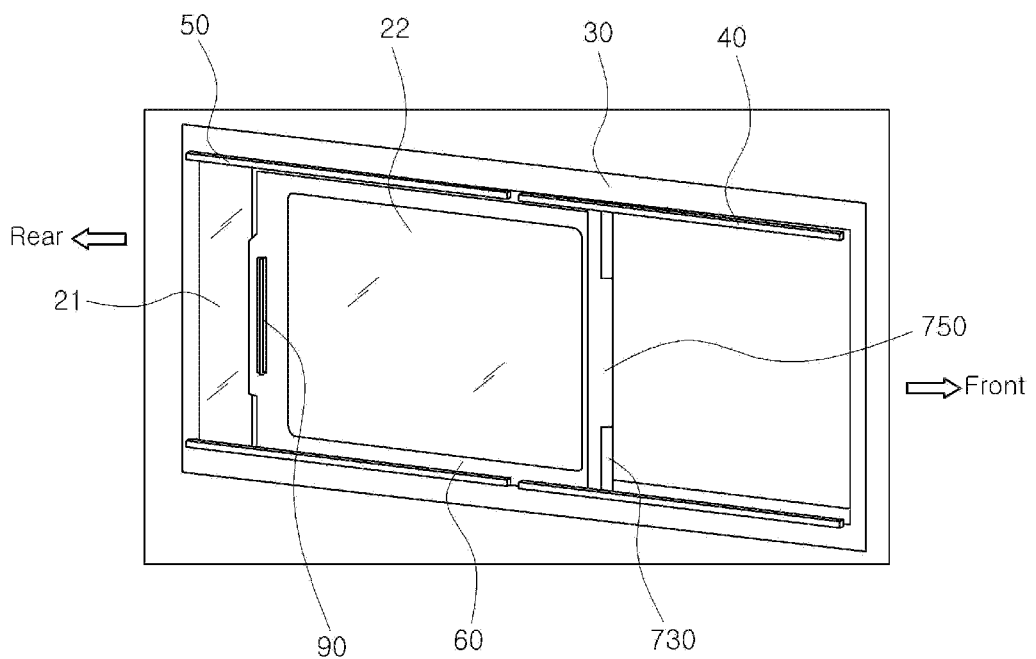
FIG. 19 is a view showing an opened state of the moving glass.
Figure 20:
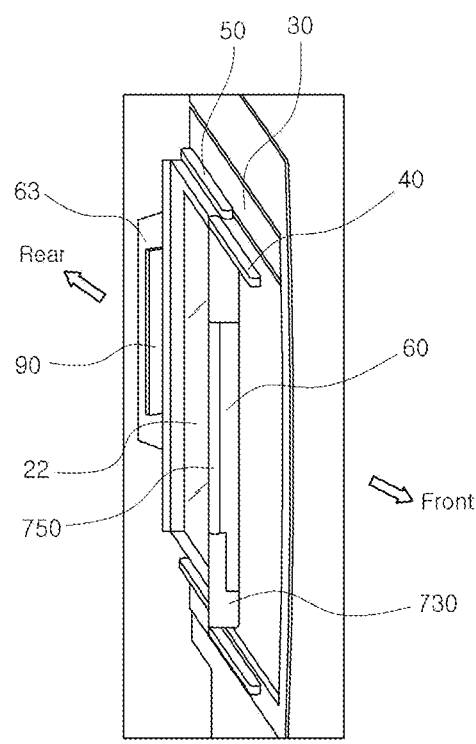
FIG. 20 is a view of the moving glass when viewed from the rear of FIG. 19.

FIG. 19 is a view showing an opened state of the moving glass 22, and FIG. 20 is a view of the moving glass when viewed from the rear of FIG. 19.

As described above, the flush glass assembly according to various embodiments of the present invention is constructed so that, when the moving glass 22 is opened, the direction of the force that the user applies to the handle 90 is the same horizontal direction as the direction in which the moving glass 22 slides to open. Thus, it is possible to greatly improve the ease of operation by the user, and to enhance the merchantability of the vehicle.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A flush glass assembly for a vehicle, comprising:
    front and rear rails fixed to a fixed glass frame in a lengthwise direction of the vehicle;
    a front guide rotatably coupled to a front vertical frame of a moving glass frame, and fitted into the front rails so that upper and lower ends thereof are allowed to move along the front rails;
    a rear guide rotatably coupled to a rear vertical frame of the moving glass frame, and fitted into the rear rails so that upper and lower ends thereof are allowed to move along the rear rails; and
    a handle that is locked by connection with a middle vertical frame of the fixed glass frame when moving glass is kept closed, and is rotatably coupled to the rear guide so as to allow the rear vertical frame of the moving glass frame to protrude towards an interior of the vehicle when external force is applied in a rearward direction to open the moving glass.

2. The flush glass assembly according to claim 1, wherein the front rails are constructed to farther protrude toward the interior of the vehicle than the rear rails.

3. The flush glass assembly according to claim 1, wherein the front guide includes:
    a front hinge that is rotatably coupled to the front vertical frame of the moving glass frame via a front hinge shaft and is integrally formed with front rail locking pins fitted into the front rails at upper and lower ends thereof; and
    a front carrier that is rotatably coupled to an intermediate hinge shaft formed on an intermediate portion of the front hinge and is integrally formed with front rail lugs fitted into the front rails at upper and lower ends thereof.

4. The flush glass assembly according to claim 1, wherein the rear guide includes:
    a rear hinge that is rotatably coupled to the rear vertical frame of the moving glass frame via a rear hinge shaft and is integrally formed with rear rail locking noses fitted into the rear rails at upper and lower ends thereof; and
    a rear carrier that is rotatably coupled to a first hinge shaft formed on an intermediate portion of the rear hinge and is integrally formed with rear rail lugs fitted into the rear rails at upper and lower ends thereof.

5. The flush glass assembly according to claim 3, wherein:
    each front rail locking pin is formed so as to have a quadrilateral cross section; and
    each front rail includes a front rail lock at a front-side end thereof, the front rail lock including a front rail locking hole having a symmetrical sector form into which the front rail locking pin is allowed to be inserted.

6. The flush glass assembly according to claim 3, wherein an intermediate portion of the front vertical frame of the moving glass frame is integrally formed with a front frame protrusion, through which the front hinge shaft passes to make a pivotable connection with the front hinge.

7. The flush glass assembly according to claim 4, wherein:
    each rear rail locking nose is formed so as to have a quadrilateral cross section; and
    each rear rail includes a rear rail lock at a front-side end thereof, the rear rail lock including a rear rail lock hole having a symmetrical sector form into which the rear rail locking nose is allowed to be inserted.

8. The flush glass assembly according to claim 4, wherein:
    the rear vertical frame is integrally formed with a pair of rear frame protrusions, into which the rear hinge shaft is fitted to form a pivotable connection with the rear hinge, on upper and lower sides thereof;
    the rear frame protrusions are integrally connected with a handle frame that is bent towards the interior of the vehicle between the rear frame protrusions;
    the handle frame includes a handle hole between the rear vertical frame and the rear frame protrusions so that the handle is installed through the handle hole.

9. The flush glass assembly according to claim 8, wherein:
    the rear hinge is integrally formed with a second hinge shaft parallel to the first hinge shaft at the intermediate portion thereof; and
    the handle includes:
    a handle body having a shaft hole into which the second hinge shaft is rotatably fitted;
    a handle operating part that is integrally formed with the handle body and is installed through the handle hole to come into contact with the handle frame; and
    a handle locking part that is integrally formed with the handle body and is installed so as to be in contact with a bottom of the rear hinge.

10. The flush glass assembly according to claim 9, wherein:
    the handle locking part includes a handle locking groove for locking with the middle vertical frame of the fixed glass frame in a lengthwise direction thereof; and the middle vertical frame is integrally formed with a frame locking rib that has an L-shaped cross section and is inserted into the handle locking groove.

* * * * *